Patented Aug. 14, 1928.

1,681,009

UNITED STATES PATENT OFFICE.

PAUL W. PETERSEN, OF BAY CITY, MICHIGAN.

PROCESS OF REFRIGERATING AND PRESERVING COMESTIBLES.

No Drawing.   Application filed June 23, 1923.  Serial No. 647,373.

My invention relates to methods involving refrigeration for preserving juicy or watery comestibles and more particularly to improvements in the art of freezing such comestibles and preserving them during and after the cold storage thereof.

I have employed throughout this specification the term "comestible" and by this term I mean juicy or watery comestibles such as fish, varieties of meats, fruits, etc., that are subject to deterioration from their fresh or initial state.

One object of this invention resides in the provision of an efficient method of applying to the comestible a preserving agent which may be in the form of a germicide or fungicide solution and which after application to the comestible may be thoroughly frozen thereon and thereby retained in suitable position and form ready to become especially effective upon thawing.

Another aim of my invention is to provide a germicide solution to be used as above indicated and which may include in certain instances a deliquescent salt which will diminish evaporation effects and losses usually encountered in the refrigeration and storage of comestibles.

Another object is to provide for frozen comestibles, a protective ice coating, preferably germicidal in nature and either isoosmotic or hypoosmotic in reference to the comestible. Such a coating may take the form of a solid block of ice within which the comestibles may be frozen.

A further object of this invention resides in methods of providing a preserving and protective icy coating to refrigerated comestibles, which coating may contain one or more diffused preserving agents and may be readily applied to the comestible while in a frozen condition.

A further aim of my invention is to provide an improved method of preserving refrigerated comestibles involving the application of preserving agents in a particular manner to the comestible both before and after freezing thereof in order to most efficiently protect the article against decay.

Another object of this invention is comprised in a method of efficiently preserving comestibles without the necessity of using excessive amounts of preserving agents in such quantities, or of such a character as to be undesirable or harmful in the food.

Still another object of this invention is to provide units of frozen and preserved comestibles in such form as to be desirable articles of commerce.

Other objects and advantages will become apparent from the following description of my invention and from the appended claims. The following description will also serve to describe in detail the preferred embodiments and methods of practicing my invention.

Although in the following description my invention is more particularly described as adapted to the treatment and preservation of comestibles in the nature of fish, I desire it to be understood that the invention is also applicable to some other comestibles such, for example, as varieties of meats and fruits.

It is now a common practice to wash comestibles, such as fish, before they are frozen and placed in cold storage. I have found that it is preferable to use a washing solution comprising pure water containing a preservative in the nature of a germicide or fungicide. By using a germicide in this manner before the comestibles are subjected to the freezing process, a part of the solution may adhere to the surfaces of the comestible and thus be available in convenient form to mix with the moisture that may develop upon thawing the comestible after storage. Also, further important advantages, which will hereinafter be described, will result from combining the germicidal bath with a freezing process of the character here described. As a satisfactory germicide for this purpose, I have found that sodium hypochlorite possesses very desirable properties when used as a solution of a concentration in the neighborhood of 0.1% or less.

After being washed or moistened in the preservative solution, the comestibles should preferably be very rapidly and thoroughly frozen without coming into direct contact with any liquid refrigerant, or other heat transferring substance which would tend to wash off, mix with or dilute the selected preservative.

I have found that the process and apparatus as disclosed in my Patents No. 1,422,126, and 1,528,891, and in my pending applications No. 629,780, filed April 4, 1923, No. 629,781, filed April 4, 1923 and No. 641,648, filed May 26, 1923, is very satisfactory for the refrigeration of comestibles after having been washed in the preservative solutions. By this process the comestible units may be very closely packed within a narrow elongated container to eliminate as far as possible all air spaces therebetween. The containers as disclosed in the aforementioned patents and applications are preferably formed with walls composed of a material possessing high heat conductivity, thereby permitting a very rapid transfer of heat from the closely packed comestibles directly to a surrounding refrigerating liquid within which the container may be immersed. I have found it preferable to use a refrigerating liquid surrounding such a container, which may be cooled to a very low temperature without solidification. Calcium chloride solutions, or solutions of other salts having comparatively high molecular weights may be very satisfactorily used for this purpose. By the use of a process and apparatus of this character, very rapid and thorough freezing of the comestibles may be effected. Such freezing is highly desirable in cases where a preserving solution has been used, for reasons which will hereinafter be explained.

Furthermore, if desired the fish, meat, or other comestible after being packed in containers may be treated by pouring the preservative solution into the containers, thus filling the interstices between the comestible units and permitting the units to be frozen together in a solid mass with the ice and preservative. In order to eliminate osmotic action the preservative solution in this case should preferably be strengthened somewhat, for instance by adding particles of salt of kinds already found in the juice of the comestible to a point where it is nearly or practically isoosmotic with the liquid inherent in the comestible treated.

In freezing comestibles which have been treated with an active germicidal fungicide, or other preserving agent, it is desirable to rapidly cool the comestibles to a very low temperature to insure the thorough freezing of both the comestible and the preserving solution. Such procedure will serve to largely prevent any possible dissociation of the preserving agent, or of salts introduced to raise the osmotic pressure of the preserving solution while the comestibles are frozen and in cold storage and will furthermore insure the retaining of a sufficient concentration of the solution to be effective even after the comestibles are in storage in their thoroughly frozen condition for considerable time.

It is well known that the addition of quantities of most soluble salts to water cause a somewhat proportional lowering of the freezing point but not of the "cryohydric point" of the solution. For example, if we start with a saturated solution of a salt at a temperature in the neighborhood of 32 degrees F. and gradually cool the solution, as we do so, more and more of the solute will generally separate out in a solid or crystalline form and the remaining solution will become less concentrated although still saturated due to the fact that a lower temperature generally diminishes the solute capacity of a solvent; or in case we start with an unsaturated solution with an excess of the solvent, such as water, quantities of the water will gradually separate out in the form of ice crystals, thereby resulting in a greater concentration of the remaining liquid. However, after a certain temperature has been reached, which is peculiar to each particular combination of solvents and solutes, what is known as a cryohydrate will generally result. The cryohydric mixture will possess certain definite proportions of the solvent and solute theoretically regardless of the original concentration of the solution, the excess of either having previously separated out in the form of a solid frozen mass or crystals. The cryohydrate also is known to occur only at a practically definite temperature peculiar to the particular solvent and solutes present. Sufficient extraction of heat from the remaining cryohydrates results in its solidification as a whole to an intimately associated mass of fine but definite crystals of the solute and of the solvent. Not until this action occurs, is the solution thoroughly frozen. I have made practical use of this well known theory of cryohydrates and cryohydric mixtures in connection with freezing comestibles with or without treatment with preserving solutions. It is here emphasized that the temperature necessary to effect these cryohydric mixtures of any given particular materials is a definite value which may be mathematically or experimentally determined.

It has been proven by earlier investigators that a quick freezing of any solution will cause a great many crystallization points to form, whereas a slower freezing will cause fewer crystallization points to form. Where cryogenic temperatures are effected the multitude of crystallization points will again diminish. But for all such temperatures as are obtainable in practice on a commercial scale today, the first statement holds good. It requires a varying but still a measurable space of time for the cryohydric dissociation to take place. If an unsaturated solution is speedily solidified, a sort of a sponge like web of ice will form, enclosing in the pockets thereof cryohydric mixtures, which, when ultimate solidification is accomplished, will be cryohydrates. I have found that if the temperature of the refrigerating medium lies below the cryohydric point of the solution and the freezing is accomplished speedily, then this sponge net work will be the finest yet obtainable by commercial means and will result in a distribution of small bodies of cryohydrate throughout the ice formed. It will be obvious from the above that if the solidified solution is kept at a temperature at or below its cryohydric point no part of it can melt. The practical result in my process is a distribution of quantities of the preserving agent and other solutes present in excess of their inherent diffusibility throughout the body of the ice formed.

In the case of freezing comestibles such as fish or meat, the tissue membranes present in their structure to some extent retard the theoretical cryohydric dissociation. Still, during comparatively slow freezing a substantial cryohydric dissociation, at least in each cell, is unavoidable. I have found that it is this cryohydric dissociation which causes an osmotic action through the semipermeable cell walls or sarcolemma of the adjoining non-solidified tissue. The tissues are more permeable in dead than in live objects. It is this osmotic action in conjunction with the comparatively few crystallization points produced by slow freezing which causes the formation of disproportionately large bodies of ice in some cells, the formation of ice in the cell walls proper, or sarcolemma, and an uneven distribution of cryohydric mixtures and cryohydrates throughout the comestible—all of which tends to break down the tissue of the comestible, thereby producing a product when thawed inferior to a product in which such defects are eliminated. I have found that if a rapid solidification is effected at a temperature at or below the cryohydric point of the liquids inherent in the comestible frozen, the cryohydric dissociation is fairly evenly distributed, and the osmotic action in the comestible during freezing is tremendously diminished or practically eliminated, thereby producing an article which when thawed out remains practically indistinguishable from the article in its original state. It will be obvious from the above that if a comestible so frozen is kept at a temperature at or below the cryohydric point of the liquid inherent therein, then no part of the comestible can thaw out. On the other hand it will be obvious that if a solidified comestible is kept at a temperature above its cryohydric point, small bodies of cryohydric mixture cannot help but occur in the "sponge pockets" of the web referred to. I have found that such small particles of cryohydric mixture will exert a melting and osmotic action upon the surrounding icy tissue proportionate to the temperature at which it is kept. The higher the temperature the greater the thawing and the corresponding osmotic action. If the temperature is thereupon again reduced, freezing will reoccur and if such freezing is slow the drawbacks of slow freezing will be unavoidable. I believe that herein I have found the reason for the detrimental effects of varying temperatures upon articles kept in cold storage. The thawing points in any one comestible may be very tiny. As comestibles at the present time are not kept in commercial cold storage below their cryohydric point, such "thawing points" can be discovered by the cutting in two of a frozen comestible. In many cases drops of liquid will appear. Such drops of liquid have a strong taste and will not fully freeze except the temperature of the comestible is reduced below its cryohydric point. They may dry away from evaporation but in that case the resultant salts will tend to melt the adjacent parts of icy frozen tissues.

I have further found that if comestibles are frozen in a "block" of ice with a liquid solidified in crevices and spaces around the same, freedom from detrimental results may be assured if the solidification is accomplished quickly and at sufficiently low temperatures. I prefer that such liquid be substantially isoosmotic or hypoosmotic in relation to the comestible for several practical reasons. If the liquid is isoosmotic no harm can come from delay before freezing starts and if hypoosmotic, any evaporation during protracted storage will leave the liquid formed upon thawing out near to an isoosmotic solution harmless to the comestible.

It is, therefore, very advantageous to freeze comestibles which have been treated with a preserving agent which may be subject to dissociation as is sodium hypochlorite, in a manner such that they will be rapidly cooled to or below the cryohydric temperature of the preserving solution. Such procedure insures the practical solidification of the germicide and other solutes present in the form of fine, fairly evenly distributed crystals before substantial dissociation, precipitaton, or evaporation of the solution may take place. The above described processes and apparatus offer satisfactory means for accomplishing such freezing.

As above indicated, it is desirable to store comestibles treated in this manner at a temperature at least as low as the cryohydric temperature of the preservative solution. This permits the preservative agent to remain in solidified and distributed form in a position where it becomes very effective and efficient upon thawing of the comestible. The storage at unusually low temperatures as above described inhibits the action of osmosis beneath and upon the surfaces of the comestible during storage. Such action, if allowed to continue for a prolonged period during slow refrigeration or after incomplete solidification of the preservative or comestible, may result in an excessive and undesirable absorption by the comestible of the preserving solution or ingredients thereof.

After the comestibles have been treated by washing and freezing in the above described manner, it may be desirable to add further preserving and protective means in the form of an icy "glazing" to the exterior of the comestible units. The purpose of the practice which is usually termed "glazing" is to prevent the loss of moisture by evaporation from the fish or other comestible itself during periods of cold storage. Such loss of moisture involves a loss of weight and aromatic qualities which is of considerable commercial importance. The shell of ice may evaporate during storage but no evaporation from the fish itself will take place until this shell of ice, in which it is enclosed, has been evaporated off at any spot. This "glazing" operation may preferably be performed by merely immersing the comestible units in a cold bath, also comprising a solution of a germicide or fungicide. A solution of sodium hypochlorite of a concentration approximating 0.1% or less may also be here used. If the comestibles are then in a thoroughly frozen and very cold condition, an icy coating including diffused quantities of the preservative will be formed upon the exterior thereof. This coating will serve to cover and retain in position any preserving material which may have been previously applied, as well as serve as additional means of protection. It is preferable that during the glazing process, the comestible should be passed through the glazing liquid very quickly and while thoroughly frozen, in order to prevent such liquid from diluting the germicidal agents previously applied, and in order to produce an ice coating with sufficient rapidity to catch and retain particles of the preservative which might otherwise fully separate out from the liquid. Accordingly, it is preferable that the frozen comestibles should be at a temperature which lies below the cryohydric temperature of the glazing bath.

Comestibles may be treated in accordance with either or both of the above processes by "washing" or "glazing" with the preservative, depending upon the security against deterioration that may be necessary or desired. The frozen comestible may also be given first a "glaze" with a germicide solution and thereupon an additional "glaze" of pure water. This can be accomplished very readily in accordance with my U. S. Patent, #1,388,298, which describes a process for applying two successive glazings. In such cases, no evaporation of the germicide glaze can take place until the pure water "glaze" is evaporated off. The use of the pure water glaze may also be advantageous when the exposed germicide is objectionable for any reason whatsoever. In case the germicidal glaze alone is used, a greater proportion of ice than germicide may evaporate off during storage for any long period of time leaving part of the preservative in its dry state on the surface of the fish. However, when the fish or other comestible is thawed out, the germicide will automatically mix with the resulting moisture and thereby form an immediate protection against destructive organisms of various sorts. Therefore, during storage the presence of the germicide will tend to prevent deterioration if the storage temperature should, for any reason, rise to a point where decomposition, thawing or any bacteriological action might otherwise take place.

The above described rapid freezing processes are of especial value in connection with the use of sodium hypochlorite as a preservative, since this substance is known to easily dissociate in accordance with the following equations, thus liberating free oxygen and forming common salt:

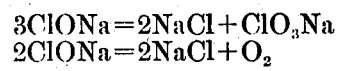

The rapid and thorough freezing of sodium hypochlorite solutions serves to check dissociation and evaporation, thus reserving the preservative in its active form ready to be effective upon thawing of the comestibles and the ice coatings. A slow freezing process on the other hand would permit large quantities of the oxygen to dissociate and evaporate.

However, even before complete solidification may be effected by rapid low temperature freezing, a portion of the sodium hypochlorite solution may become dissociated and accordingly, I have found it to be good practice to use concentrations of this solution as high as 0.1%, as above mentioned. It has been found that solutions of sodium hypochlorite of a concentration approximating a maximum of 0.025% will freeze with water with this salt fairly evenly diffused throughout the ice as formed. By using a solution with a concentration of about 0.1% at the beginning of the process, sufficient undissociated salt will remain to provide for the 0.025% freezing mixture, which quantity will be retained and be present during thawing. The 0.025% solution forms an effective and satisfactory preserving agent.

Although the sodium hypochlorite solution is a non-irritant, and forms a safe, comparatively inexpensive preservative, it should be understood that other materials and mixtures having analogous properties may also be used in accordance with my invention. For example, a small quantity of chlorine gas dissolved in water may be a satisfactory substitute for the sodium hypochlorite solution. It is advantageous that such substances should be capable of uniform diffusion in effective quantities throughout the ice when formed. I have also found it to be desirable in some cases to use a slightly alkaline preservative solution since solutions in the nature of sodium hypochlorite may become especially active in the presence of even small traces of acid and thus become too rapidly dissipated. A small fraction of one per cent of calcium hydroxide is satisfactory for producing the desired alkalinity. Also in some cases it is desirable to use in connection with the freezing processes as above described, a germicidal agent comprising a deliquescent salt such as calcium chloride. Such a precaution tends to prevent the undesirable drying of the comestible as often results during freezing and storage thereof.

While I have described several preferred embodiments of my invention, it is to be understood that still further changes and substitutions may be made therein, and accordingly I desire to limit my invention only to the scope of the following claims or as required by the prior art.

Having thus described my invention, what I claim as new and desire to secure by Letters Patent in the United States, is:

1. The process of preserving comestibles which comprises washing the comestibles in a solution containing an edible diffusive germicidal agent, and thereafter refrigerating the comestible together with said solution remaining thereon to a temperature at least as low as the cryohydric temperature of the solution.

2. The process of preserving comestibles which comprises washing the comestibles in a solution containing an edible hypochlorite, and thereafter freezing the comestible together with said solution remaining thereon.

3. The process of preserving comestibles which comprises moistening the comestible with a solution containing an edible diffusive germicidal agent, and thereafter refrigerating the comestible to a temperature at least as low as the cryohydric temperature of said solution, the concentration of said solution being such that a cryohydrate remains after complete freezing without separation of solid solvent.

4. The method of preserving fish which consists in moistening the fish with a solution of sodium hypochlorite, and then rapidly freezing the fish together with the solution thereon.

5. The process of preserving comestibles which comprises washing the comestibles in a solution containing a germicidal agent such as sodium hypochlorite normally subject to dissociation, thereafter rapidly freezing the comestible together with said solution remaining thereon, and subsequently applying a coating of ice to the comestible.

6. The method of preserving and protecting comestibles which comprises immersing for a short period the comestibles while in a frozen condition in a cold solution containing an edible diffusive germicidal agent whereby a coating of ice is formed thereon.

7. The method of preserving and protecting comestibles which comprises immersing for a short period the comestibles while in a frozen condition in a cold solution of sodium hypochlorite whereby a preserving icy coating is forced thereon.

8. The process of preserving fish which comprises moistening the fish in a solution of sodium hypochorite, then immediately thereafter refrigerating the fish to a temperature at least as low as the cryohydric temperature of the solution, the concentration of the solution used being such that a cryohydrate remains after complete freezing thereof without separation of solid solvent, and subsequently applying a preserving icy coating to the frozen fish by immersion in a cold solution of sodium hypochlorite.

9. Frozen comestibles covered with an icy coating containing a diffusive germicide comprising sodium hypochlorite.

10. Frozen comestibles covered with an icy coating containing an edible diffusive germicide, and a second coating comprising substantially pure ice.

11. The process of preserving comestibles which comprises immersing them in a quantity of an edible germicidal solution such solution being of a concentration substantially isoosmotic in respect to the juices of the comestible, and then freezing the comestible together with the surrounding solution into a solid block.

12. The process of preserving comestibles which comprises immersing them in a quantity of an edible germicidal solution such solution being of a concentration substantially isoosmotic in respect to the juices of the comestible, then freezing the comestible together with the surrounding solution into a solid block, and then immersing the resulting block in cold water whereby a coating of substantially pure ice is formed, thereover.

13. A comestible having a frozen coating of an edible germicidal solution at a temperature substantially at or below the cryohydric temperature of the said germicidal solution and of the inherent juices contained in said comestible.

In witness whereof, I have hereunto subscribed my name.

PAUL W. PETERSEN.